United States Patent [19]
Kramer et al.

[11] Patent Number: 5,973,291
[45] Date of Patent: Oct. 26, 1999

[54] METHOD AND SYSTEM FOR DETERMINING THE FEEDABILITY OF WELDING WIRE

[75] Inventors: Arthur Kramer, Solon; Boris Kahn, Beachwood, both of Ohio

[73] Assignee: Lincoln Global, Inc., Cleveland, Ohio

[21] Appl. No.: 09/132,587

[22] Filed: Aug. 11, 1998

[51] Int. Cl.$^6$ ................................................. B23K 9/095
[52] U.S. Cl. ............................... 219/130.01; 219/137.71
[58] Field of Search .......................... 219/130.01, 137.7, 219/137.71, 137 R, 137 PS

[56] References Cited

U.S. PATENT DOCUMENTS 5,302,805  4/1994  Morris et al. ...................... 219/137.71

*Primary Examiner*—Clifford C. Shaw
*Attorney, Agent, or Firm*—Vickers, Daniels & Young

[57] ABSTRACT

A method and system of determining the feedability of a continuous welding wire having a known diameter, said method and system comprising the steps of providing a supply of welding wire; pushing the wire by a wire feeder through a welding cable having a given long length and terminating in a welding gun with a tubular contact tip with a wire receiving passage generally matching the selected diameter of said welding wire, sensing the reactive force of the wire feeder as it pushes the wire through the cable and the tip; and causing a generally fixed current to flow between the contact tip and a workpiece whereby the advancing welding wire is melted and transferred to the workpiece in accordance with a given welding process.

33 Claims, 6 Drawing Sheets

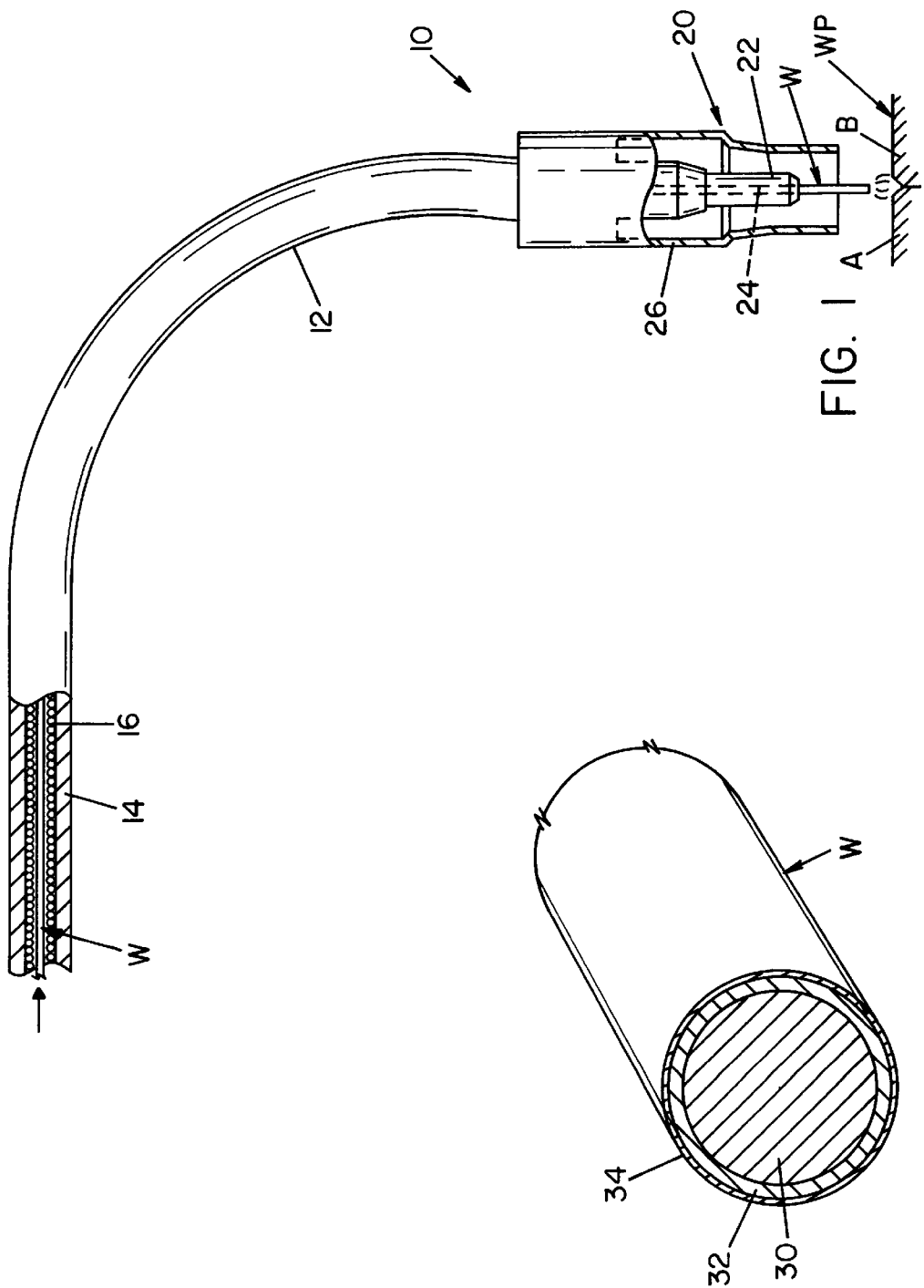

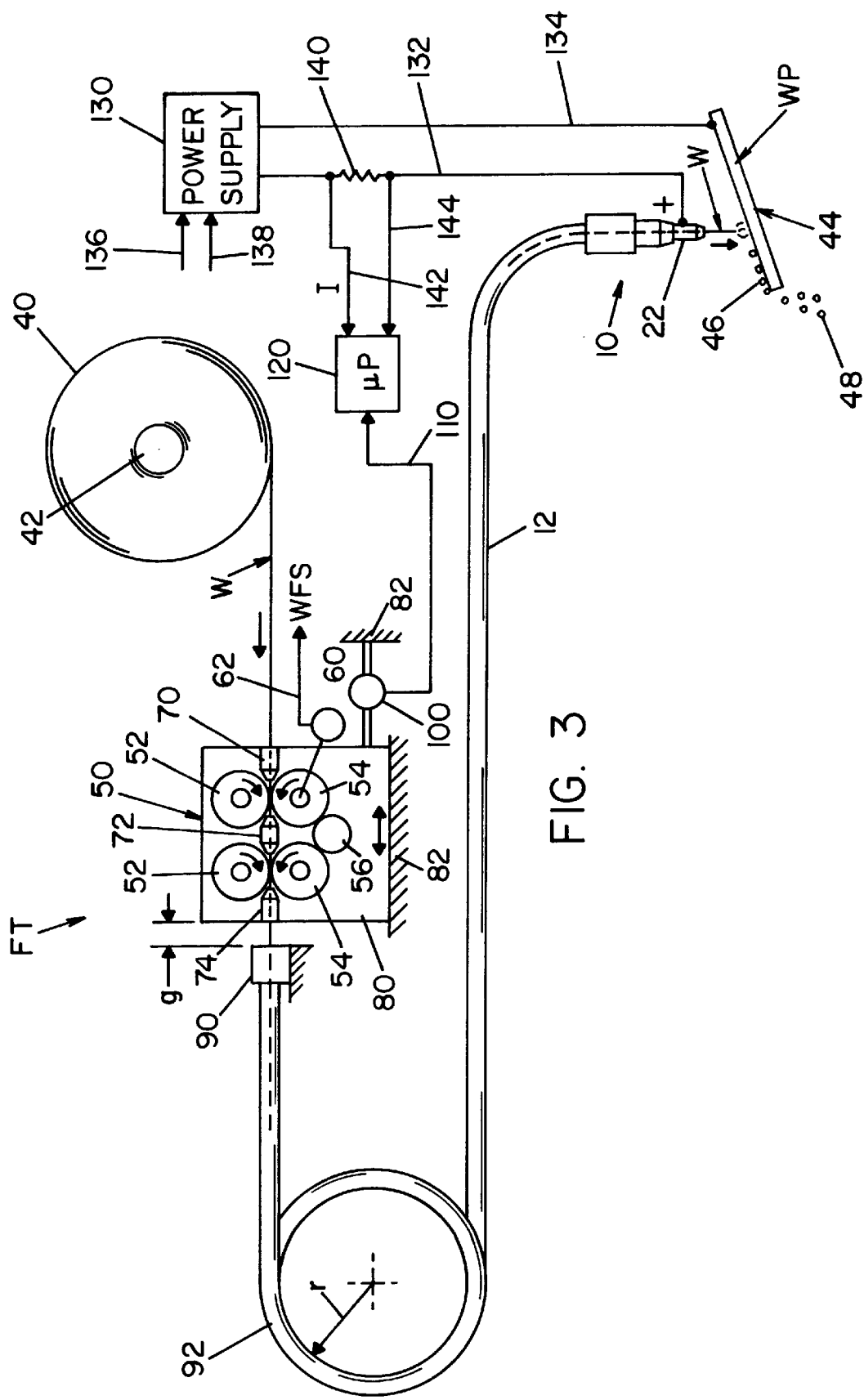

METHOD AND SYSTEM FOR DETERMINING THE FEEDABILITY OF WELDING WIRE

The present invention relates to the art of arc welding by advancing a continuous welding wire or electrode toward a workpiece as a current is passed between the wire and workpiece and more particularly to a method and system for determining the feedability of a welding wire in this type of arc welding process.

BACKGROUND OF INVENTION

A substantial amount of the arc welding is now done industrially by the use of robotic and automatic welding equipment wherein a supply of welding wire is pulled from a drum by a wire feeder and pushed through a welding cable and then through a welding gun movable along a workpiece. The robot performs a continuous welding operation. The welding gun includes a tubular contact tip allowing a welding current to be conducted to the wire moving through a wire receiving passage in the contact tip so the current between the wire and workpiece melts the wire for deposition of the metal onto the workpiece. This robotic or automatic type welding equipment operates continuously over many hours repeating the same welding operation. It is essential that the moving welding wire be provided to the welding operation while advancing at the desired rate coordinated with the controlled rate of movement between the electrode or wire and the workpiece. In many robotic installations, the distance between the wire feeder and the welding gun is substantial, up to 10–15 feet. In automatic installations the length can be up to 20–30 feet. In addition, the cable through which the wire is pushed is often bent into contorted curves to facilitate the proper positioning of the wire at the welding operation even though the position of the wire feeder is fixed on the robotic or automatic welding equipment. Any disruption of the supply of welding wire due to increased resistance to movement of the wire through the cable, or otherwise, is extremely costly in an automatic manufacturing facility. Consequently, it is necessary to have an uninterrupted supply of welding wire that is pushed through the cable, irrespective of many bends in the cable and friction in the contact tip. The welding operation must be performed consistently over hours of operation. This objective is difficult to obtain since the continuous welding wire may contain various surface coatings or substances, such as lubricant. To provide continuous feeding, some manufacturers apply a lubricant to the wire. Other steps are taken in an attempt to reduce the tendency to interrupt in the welding operation by feeding problems experienced by the continuously moving welding wire. However, in the past there has been no determination of the feedability of the wire until it was actually used at the robotic station. Consequently, the welding facilities rely upon the reputation of the wire from a given supplier. A subjective evaluation based upon experience is made regarding a particular wire. This subjective evaluation is then employed for the purchase of additional wire. This subjective analysis is the norm in the field; however, wire may change from one drum or coil to the next and the wire can change from one run to the next in the plant producing the welding wire. Thus, there has been no manner of determining the feedability quality of the welding wire, except for actual use of the wire over a period of time. This practice is not an accurate evaluation of the quality of the welding wire. It has been found that high quality wire is rejected based upon past experience regarding its feedability through the robot equipment. Unacceptable feedability problems are not corrected by adding lubricant. To the contrary the problem is solved by the manufacturing process. Thus, there is a need for an objective evaluation of continuous welding wire, corded or solid, to determine how it will function over long periods of time in a continuous welding operation such as a robotic welding station. Such evaluation could also be used to modify manufacturing techniques used in producing the welding wire.

THE PRESENT INVENTION

The present invention relates to a method and system for objectively determining the feedability of a welding wire. This concept is distinguished from the prior attempts to increase the ability to continuously move welding wire that involved the addition of a lubricant to the surface of the welding wire. The wire is actually evaluated as to its feedability and not its lubricity. The invention involves testing the wire over several relatively short test cycles. By using the present invention, a welding wire is objectively evaluated as to its feedability in an actual welding environment by short test cycles of less than about 10 minutes. In practice, the test cycles may vary with a maximum cycle length in the range of 2–5 minutes. Several of these test cycles are conducted on a single welding wire so the average feedability of the wire is determined. In addition after 2–5 test cycles performed in accordance with the present invention, quality of the wire being monitored will appear. This quality will indicate feeding difficulties when the wire is actually used in the field.

The present invention can be used by the manufacturer of welding wire to determine the quality of the welding wire prior to shipment. In addition, the present invention can be employed for testing the mechanical design of welding guns, the performance of a lubricant, if any is used on the wire, the operation of feeding devices and the drawing technique used in producing the welding wire. Thus, the present invention has a wide range of uses in the arc welding field. It can be employed as an objective evaluation of the welding wire as well as testing of the various other mechanical components and manufacturing techniques that must come together to product a quality weld for a continuous welding operation.

In accordance with the present invention, there is provided a method of determining the feedability of a continuous welding wire having a known diameter. The feedability of the continuous wire is not lubricity, but is the ability of the wire to actually be fed in a welding operation.

In accordance with the method and system of the present invention, a supply of continuous welding wire is provided either in a spool or standard drum, pushing the welding wire by a wire feeder through a welding cable having a given long length, between 10–30 feet. The cable is terminated in a standard welding gun with a tubular contact tip having a wire receiving passage generally matching the selected diameter of the welding wire. The cable has at least one bend, which may be a loop. This bend is generally in the range of 120°–720° and preferably about 540°. The length in arc degrees is selected for controlling the amount of resistance the wire experiences. The reactive force of the wire feeder is sensed as it pushes the wire through the cable and through the contact tip while a generally fixed welding current flows between the contact tip and the workpiece so that the advancing welding wire is melted and transferred to the workpiece in accordance with a selected welding process. The workpiece can be a cooled piece of copper so the weld metal hits the workpiece and then is removed. This simulates a welding process where the wire and workpiece are moved relative to each other. A time based trace of the reactive force is created for a set time cycle such as less than 10 minutes. In practice, the time cycle is in the range of 2–5 minutes and is repeated several times with a short pause between each cycle.

In accordance with another aspect of the invention, the force necessary to pull the wire from the supply, either as a coil or drum, is measured and subtracted from the reactive force of the wire feeder to more accurately provide the actual feeding force of the wire through the cable during the short test cycles. As a more general aspect of the invention, this force to remove the wire from the supply is considered a constant tension which is subtracted from the reactive force at the wire feeder. The only reason for subtracting the pulling force from the reactive force is to have a more accurate reading or measurement of the feeding force. It is essential that a simulated welding process takes place during the practice of the present invention. It has been found that the sparking and other surface deterioration in the welding process seriously affects feedability, but not lubricity. Lubricity is not being determined by the present invention. By subtracting the pulling force from the reactive force of the wire feeder, the trace being created on a display screen of a computer or recorded by the computer will actually read the force to feed the wire as a time graph. In practice, this force is to be maintained less than 8 pounds, for 0.045 wire, and generally between 2–5 pounds, for 0.045 wire, when the length of the cable is approximately 25 feet and the cable bend is 540°. Since the time based trace is displayed on a screen, the feeding force will vary during the test cycle observed in practicing the present invention; therefore, in accordance with another aspect of the present invention the computer measuring and displaying the reactive force will also determine the maximum reactive force during a test cycle. This maximum force is also displayed on the computer screen. If the maximum force exceeds approximately 4–5 pounds for 0.045 wire, the welding wire is considered to be of lesser feedability. Should the maximum force during any of the successive test cycles exceed 8 pounds for 0.045 wire, such welding wire has poor feedability characteristics and will not be high quality wire for automatic welding operations. The values to evaluate feedability will vary with the diameter of the wire being tested. By measuring a particular wire over 3–6 test cycles of less than 10 minutes, a reading and record of the average force together with the average maximum force during each cycle can be recorded and assigned to the particular wire. In this fashion, the feedability of the welding wire is monitored and recorded for comparison with other wire and for assuring the end user of the feedability quality of the continuous wire. This method or system can be performed on a short length of a total manufacturing run of a particular given wire. In some instances the present invention can be used to measure the feedability of a wire in a drum before the drum is shipped.

By using the present invention, 2–3 test cycles for a run of a particular welding wire will determine the feedability of the wire which will allow not only manufacturing corrections and improvements in the wire itself, but also can be used in developing wire feeders, welding guns, welding gun positions in automatic welding operations and the necessary coating of the wire.

The present invention relates to a method and system for determining the feedability of a welding wire, which method and system can determine the feedability of a given run of wire with only a few short test cycles that measure feedability itself.

Another object of the present invention is the provision of a method and system, as defined above, which method and system can be used for testing the feedability of welding wire for the purpose of determining the quality of a particular wire or for comparing the quality of a particular wire with another wire.

Yet another object of the present invention is the provision of a method and system, as defined above, which method and system is easy to perform and provides an objective evaluation of welding wire taking into consideration all of the welding parameters to which the wire will be subjected in the field. This is done by using an actual welding procedure or by using a simulated welding process.

Still a further object of the present invention is the provision of a method and system, as defined above, which method and system is inexpensive to perform and generally uniform in result.

Another object of the present invention is the provision of a method and system, as defined above, which method and system can determine the feedability of a welding wire in a large drum containing 500–1000 pounds by testing only a small amount of wire for a short time.

These and other objects and advantages will become apparent from the following description.

BRIEF DESCRIPTION OF DRAWINGS

FIG. 1 is a partial drawing showing a standard welding gun and cable used in practicing the present invention;

FIG. 2 is an enlarged cross-sectional view of a solid welding wire which can be tested by using the present invention;

FIG. 3 is a schematic layout drawing illustrating the equipment for practicing the preferred embodiment of the present invention;

PREFERRED EMBODIMENT

Figure 4:
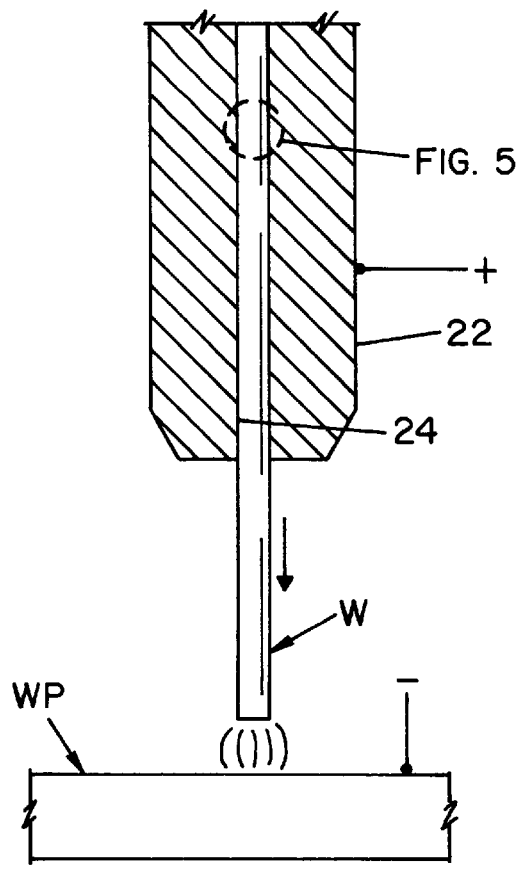
FIG. 4 is an enlarged partial view showing the welding wire passing through a contact tip toward a workpiece as used in an automatic welding operation.

Referring now to the drawings, wherein the showings are for the purpose of illustrating the preferred embodiment of the invention only and not for the purpose of limiting same, FIG. 1 shows a standard welding operation 10 wherein a long cable 12 formed from an outer cover 14 and coiled spring passage 16 terminates in a gun 20. Continuous wire W is passed through the cable and gun toward the workpiece WP while the workpiece and wire or electrode are moved relative to each other. This welding process can be defined as melting the wire and transferring the molten wire to the workpiece. Normally the metal is deposited onto the workpiece; however, the process can be simulated without the molten wire actually sticking to the workpiece. Current is directed to wire W by a standard contact tip 22 having a wire receiving passage 24 matching the diameter of wire W. As gun 20 moves wire W along workpiece WP the electrical current melts the advancing wire and deposits the wire onto the workpiece for the purpose of welding pieces A and B together. In most arc welding processes, a shielding gas is directed through cable 12 into an outer gas shield 26; however, wire W can be flux cored. Wire W is illustrated as a solid wire in FIG. 2 having a metal core 30 with an outer copper coating 32 to assist in electrical contact between the walls of passage 24 and the moving wire and an optional outer coating 34.

Welding operation 10 involves advancing wire W through cable 12 at a desired speed (WFS) coordinated with the relative speed between gun 20 and workpiece WP. In practice, this procedure is performed by robotic equipment which holds gun 20 in a desired position or moves the gun in a desired path. The welding process must be performed continuously for hours, or even days. Any interruption in the feeding of wire W toward workpiece WP involves down time. Down time is quite costly. If the welding operation is in a manufacturing line, stoppage of the supply of wire W will result in stoppage and down time of the total line. Such stoppage or down time is extremely costly in a mass production facility. Consequently, there is a desire to be assured that large quantities of wire W is available continuously over prolonged time periods without interruption. This objective is accomplished only with a wire having a high quality in the area of feedability. Feedability can not be improved by merely lubricating the wire since the wire lubrication can constitute its own inhibition to feedability. The present invention relates to a method and system for objectively determining the feedability of wire W.

A schematic layout of the equipment used in practicing the method and system of the present invention is illustrated in FIG. 3 wherein a continuous supply of welding wire indicated as a coil 40 having a center hub 42 is made available for processing at welding operation 10. The welding operation performs a specific welding procedure. Thereafter a new product is brought into position and the welding process is repeated. Repeated welding operations should be performed without wire stoppage over hours. This does not indicate a continuous single step welding process for an extended time. Indeed, the actual welding operation may be performed in substantially less than 10 minutes. The welding process is halted and the gun is moved and/or a new workpiece is positioned with respect to the gun. Thereafter, the welding process is repeated. This repeated operation of the welding process must be uninterrupted for stoppage of the wire. Indeed, in some instances the drum of welding wire W is provided which drum contains 500–1,000 pounds of welding wire having a diameter in the general range of less than 0.060 inches. When the drum is near the end of its supply of wire W, the welding operation may be halted for a short time or the wire may be spliced with the wire in the next drum of wire to maintain continuous operation of the welding operation. It is essential that the wire W have a high quality of feedability to reduce interruptions.

The feedability testing equipment FP illustrated in FIG. 3. In the practice of the invention the workpiece is a cooled piece of copper 44. The wire melts and globules of molten metal 46 are hardened upon engaging the workpiece, which is at an angle, and converted to solid particles 44 that are discarded. This is a simulation of an actual welding process. A standard wire feeder 50 having two pairs of feed rolls 52, 54 synchronized by an idler gear 56 and rotated by drive motor 60 at a desired wire feed speed WFS set by the voltage on control line 62. Tubular wire guides 70, 72 and 74 guide the wire from coil 40 and push the wire W through the welding operation 10. In accordance with the invention, wire feeder 50 is mounted on housing 80 slidably mounted, as indicated by the arrows, on a fixed frame 82 for movement only in the direction of wire travel. As wire feeder 50 pushes wire W through an inlet cable 90, feeder 50 is forced backward by reaction to the pushing force on the wire. A gap g between cable inlet 90 and feeder housing 80 is less than 0.060 inches to allow a slight amount of movement of the feeder if that is necessary. Standard load cell 100 creates an analog voltage in line 110. In practice the load cell is Model No. LCCB-100 by Omega. This voltage represents the reactive force of housing 80 as feeder 50 pushes wire W through cable 12. A microprocessor or personal computer 120 receives the analog voltage on line 110 through an appropriate analog to digital converter at the I/O bus of the computer. Consequently, microprocessor or computer 120 has a continuous input representing the reactive force on housing 80 during the test cycles when feeder 50 is pushing wire W through cable 12. The magnitude of the pushing force can be modified by providing a bend or loop 92 in cable 12. In practice, this bend has a radius r which is in the range of 12–18 inches and an arcuate length of 540°. The arcuate length at this bend can be in the general range between 120°–720°. The length of bend or loop 92 is modified to provide the desired range of forces being measured by the equipment shown in FIG. 3. The length of the cable in practice is 25 feet; however, it has been found that this length can be in the general range of between 10–30 feet.

In accordance with the invention, the equipment shown in FIG. 3 not only measures the reactive force on load cell 100, but accomplishes this objective for a very short period of time over several test cycles while an actual welding process is being performed. Thus, a power supply 130 has leads 132, 134 connected between contact tip 22 and workpiece WP. The welding process is controlled by a mode select signal on line 136 and a current select signal on line 138. In practice, power supply 130 is operated in a constant voltage mode with a current in the general range of 200–400 amperes for a wire having a diameter of 0.020–0.060 inches. The smaller wire has lower current. The actual arc current is measured at shunt 140 and is directed, as a voltage between lines 142, 144, to the I/O bus of computer or microprocessor 120. To determine the feedability in accordance with the present invention, microprocessor or computer 120 monitors, records and stores the continuously sensed reactive force indicated by the voltage on line 110 during a time or test cycle, which test cycle in practice is less than 10 minutes. Indeed, the cycle length of equipment FT has a maximum time in the general range of 2–10 minutes according to the size of wire or nature of the test. The cycle time can be selected to correspond to a representative time during which a welding operation is performed in the field. It has been found that not only should the equipment measure the reactive force, i.e. voltage on line 110, during a short time cycle, but the measuring operation should be repeated 3–5 times. Thus, the total testing of a wire can be accomplished in substantially less than 1 hour and normally in less than 30 minutes. The determined feedability will be the same as found by use of the wire in the field over hours or days. Indeed the wire in a 500 pound drum can be tested for the drum by using only a small lead from the drum.

Figure 5:
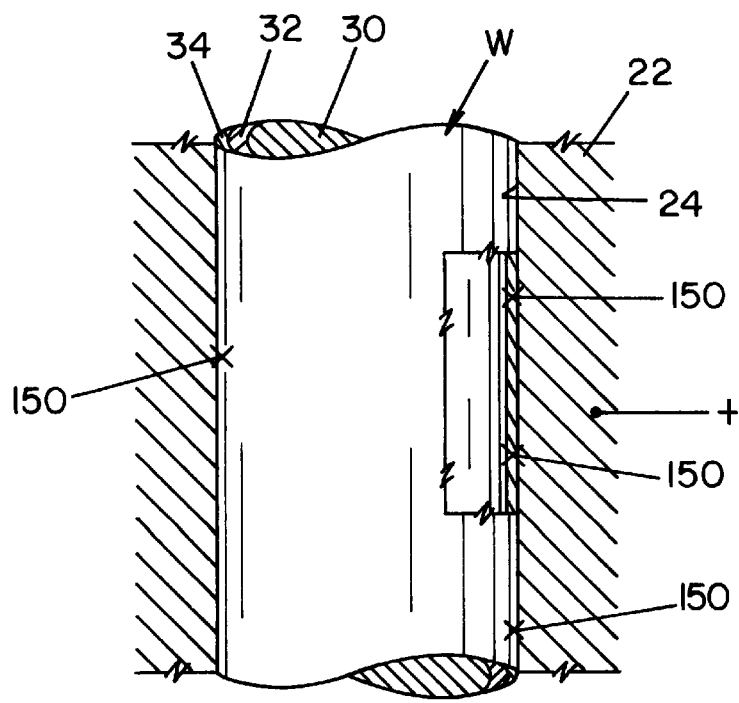
FIG. 5 is an enlarged generally cross sectional view taken along the circled area shown in FIG. 4.

Equipment FT tests the actual feedability of wire W since it measures the reactive force as a welding process is being performed. This aspect of the procedure is illustrated in FIGS. 4 and 5 wherein micro welds 150 occur between the surface of wire W and the wall of passage 24. These micro welds are caused by arcs between the contact tip 22 and metal core 30 of wire W, as shown in the cut away portion of FIG. 5. Since these micro welds affect the actual feedability of wire W, the equipment FT is operated as the electrical welding process is being performed. It has also been found that accumulation of coating 34 from one cycle to the next can drastically affect the actual feedability of wire W. Scraping of the wire in cable 12 or at inlet 90, as well as scuffing at inlet of contact tip 22 can cause material build up. This build up affects movement of the wire. The wire must be able to repeatedly pass through cable 12 and contact tip 22 without the accumulation of clogging debris or other impediments for continuous smooth, low force, feeding of the wire. The length of hollow guide cable 12 and the radius and arcuate length of bend 92 are adjusted so that the wire W has a force normally in the range of 2–5 pounds, but less than 8–10 pounds.

Figure 6:
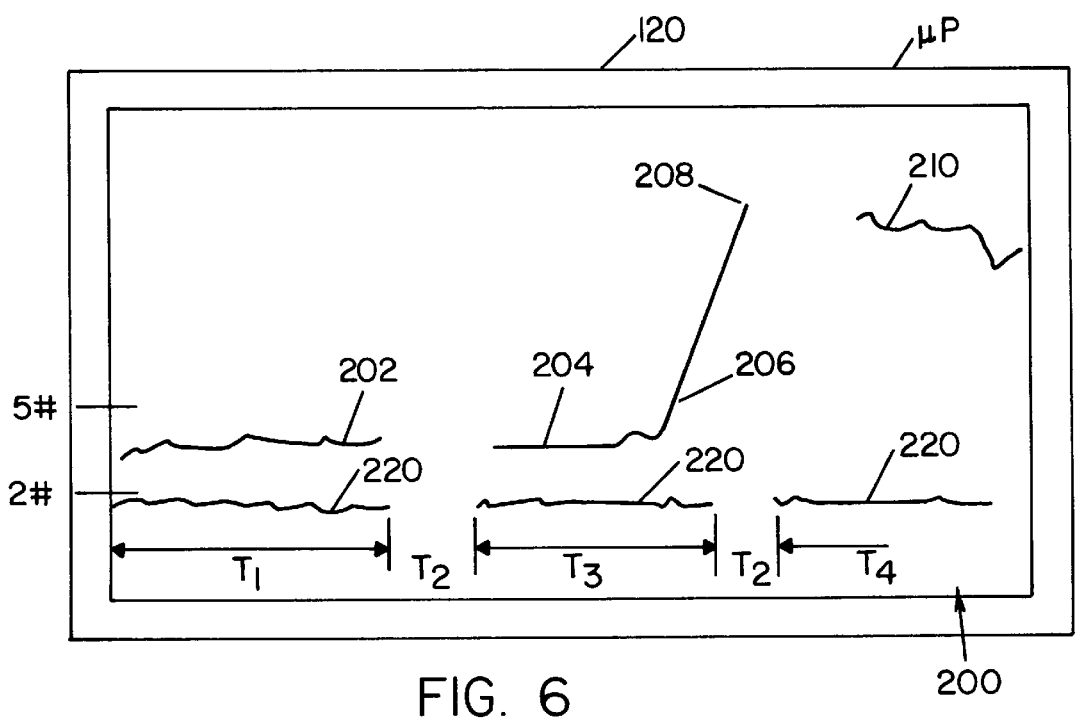
FIG. 6 is a front view of a display screen of the computer used in the preferred embodiment of the present invention and illustrating the results of testing wire in accordance with the present invention.

In accordance with an aspect of the invention, computer 120 has a display screen 200 which displays the time based trace 202 of the sensed reactive force from load cell 100. In the first test cycle, which is approximately 5 minutes and represented by time $T_1$, wire W is maintained within the preselected force limitations. There is then a wait or delay $T_2$ which is about 1–2 minutes. This wait corresponds to the normal period between welding operations in the field. Thereafter, there is another test cycle having a time $T_3$. At this time, trace 204 exceeds the 5 pounds at point 206 and progresses to a maximum force at point 208. The next cycle has a time $T_4$ where trace 210 is maintained at the high, unacceptable level. The wire W in the test illustrated in FIG. 6 is displayed on screen 200, the test cycled have times $T_1$, $T_3$ and $T_4$ separated by a delay of time $T_2$. This wire has a high maximum force and high average maximum force. The whole trace 210 is at a general maximum level. The cycles have different times because the test terminates in a test cycle when the force stays high for a long time indicating wire stoppage. Several test cycles like time $T_1$ indicating a good feedability. A test cycle like time $T_3$ and $T_4$ is an unacceptable wire. This wire has a low feedability quality. It would be disruptive in use with a robotic welding machine. It has been found that without use of welding current, wire that produced the traces 204 could be pushed at a relatively low pushing force over several measuring test cycles. By introducing the welding current as used in the invention, rapid deterioration in the feedability of wire W is detected. Thus, the invention measures actual feedability of the welding wire.

Below is a table of several wires each having a diameter of 0.045. The wires are subjected to the feedability determining method and system of the present invention. The average feeding force over several measuring cycles was calculated in computer 120 and recorded. Examples A, B and C have a feeding force which averaged less than 4 pounds. These same wires have a maximum feeding force which averaged less than about 5 pounds. These wires all have a high quality feedability as objectively determined by the method and system of the present invention. Example D is a wire which has a low feedability. The feeding force increased from 8 pounds, which is very poor, to over 28 pounds which indicates wire stoppage. The current used for these tests was 250 amperes. Four or five test cycles, each require less than about 5 minutes, can determine the ultimate feedability of a wire. This type testing of welding wire has not been done in the arc welding field. Thus, use of the present invention is extremely beneficial in producing quality wire as well as testing the mechanical characteristics of the various constituents of the welding equipment.

| EXAMPLE | TEST NO. | Feeding Force lbs. | Maximum Feeding Force lbs. |
| --- | --- | --- | --- |
| A | 1 | 3.0 | 4.3 |
|   | 2 | 2.4 | 3.5 |
|   | 3 | 2.5 | 3.2 |
|   | 4 | 2.9 | 3.6 |
| Average |   | 2.7 | 3.7 |
| B | 1 | 2.8 | 4.1 |
|   | 2 | 2.5 | 3.6 |
|   | 3 | 2.8 | 4.0 |
|   | 4 | 3.3 | 4.6 |
|   | 5 | 2.9 | 4.1 |
| Average |   | 2.9 | 4.1 |
| C | 1 | 3.3 | 4.9 |
|   | 2 | 3.9 | 5.9 |
|   | 3 | 3.0 | 4.8 |
|   | 4 | 3.3 | 4.7 |
| Average |   | 3.4 | 5.1 |
| D | 1 | 8.2 | 13.9 |
|   | 2 | 7.5 | 13.5 |
|   | 3 | 23.1 | 86.1 |
|   | 4 | 28.3 | 91.8 |
| Average |   | 16.8 | 51.3 |

Figure 7:
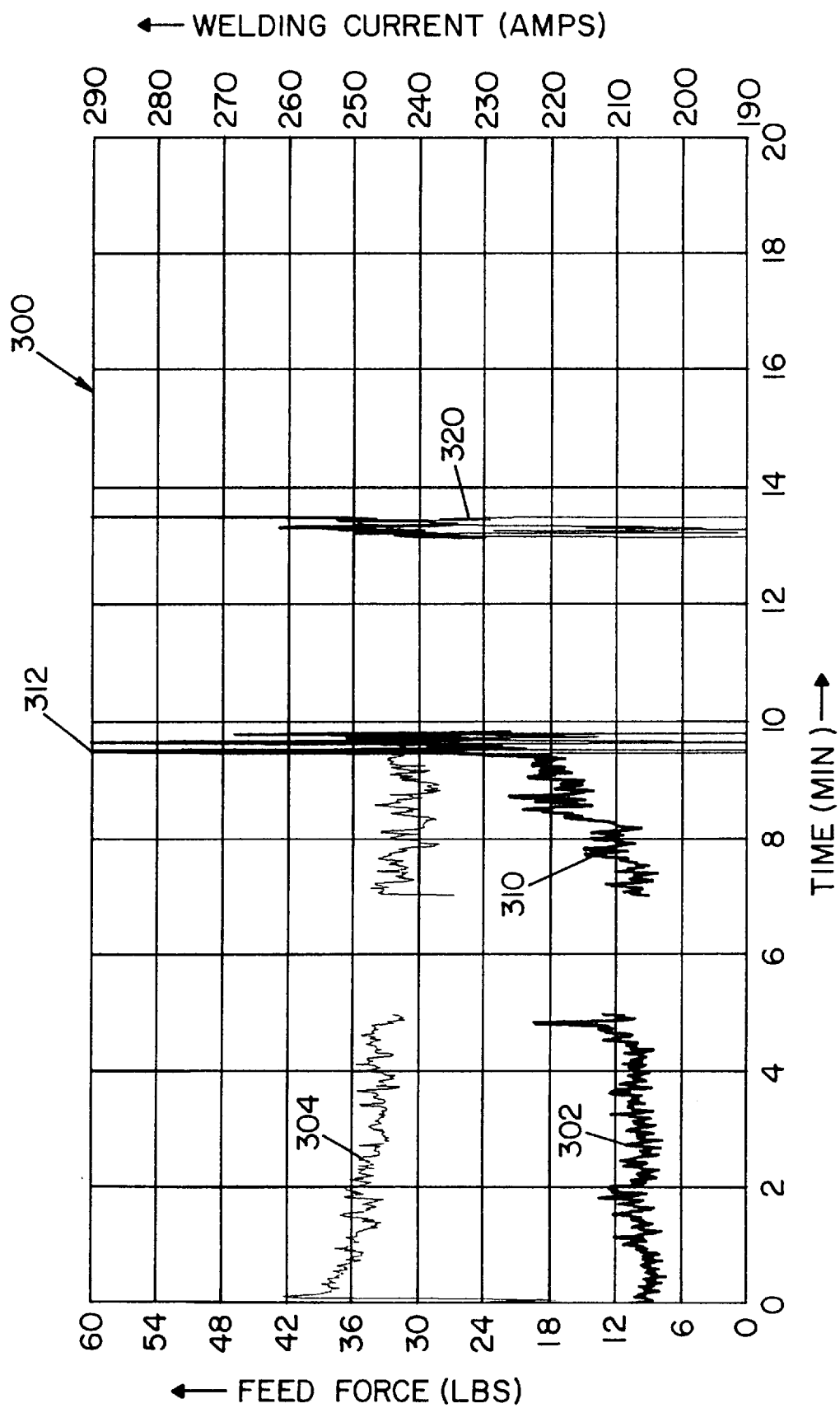
FIG. 7 is an actual display of a test result using the equipment shown in FIG. 3 wherein a wire has very low feedability; and, FIG. 8 is a block diagram illustrating a magnetic clutch for maintaining a constant pulling force on the wire as it is being pulled from the wire supply, illustrated as a coil, by the wire feeder as shown in FIG. 3.

Referring again to FIG. 6, the current time traces 220 are also displayed on computer screen 200 for cycle times $T_1$, $T_3$ and $T_4$. In this manner, the numerical values of the feeding force and the welding current can be stored in a microprocessor for subsequent use or display. An actual displayed test result for a wire which was not acceptable is illustrated in FIG. 7 where computer screen 300 shows a force trace 302 during a 5 minute testing cycle. Current time trace 304 is at about 250 amperes. The second testing cycle of the wire resulted in force trace 310. At position 312 the force trace exceeds the scale. This is indicative of a wire stoppage. The current must remain stable. Thus, swings in the current are indicative of slippage and/or intermittent stoppage. Thus, this wire is defective. The next cycle of testing of this wire indicates by trace 320 that the wire remains stopped. The advantage of the present invention is illustrated in FIGS. 6 and 7 wherein low feedability wire can be immediately identified so it will not be shipped for use in the field where feedability is demanded. By monitoring current the feedability can be analyzed. As the current increases, the stickout is reduced and vise-versa. Current drops to zero when there is a stoppage.

Figure 8:
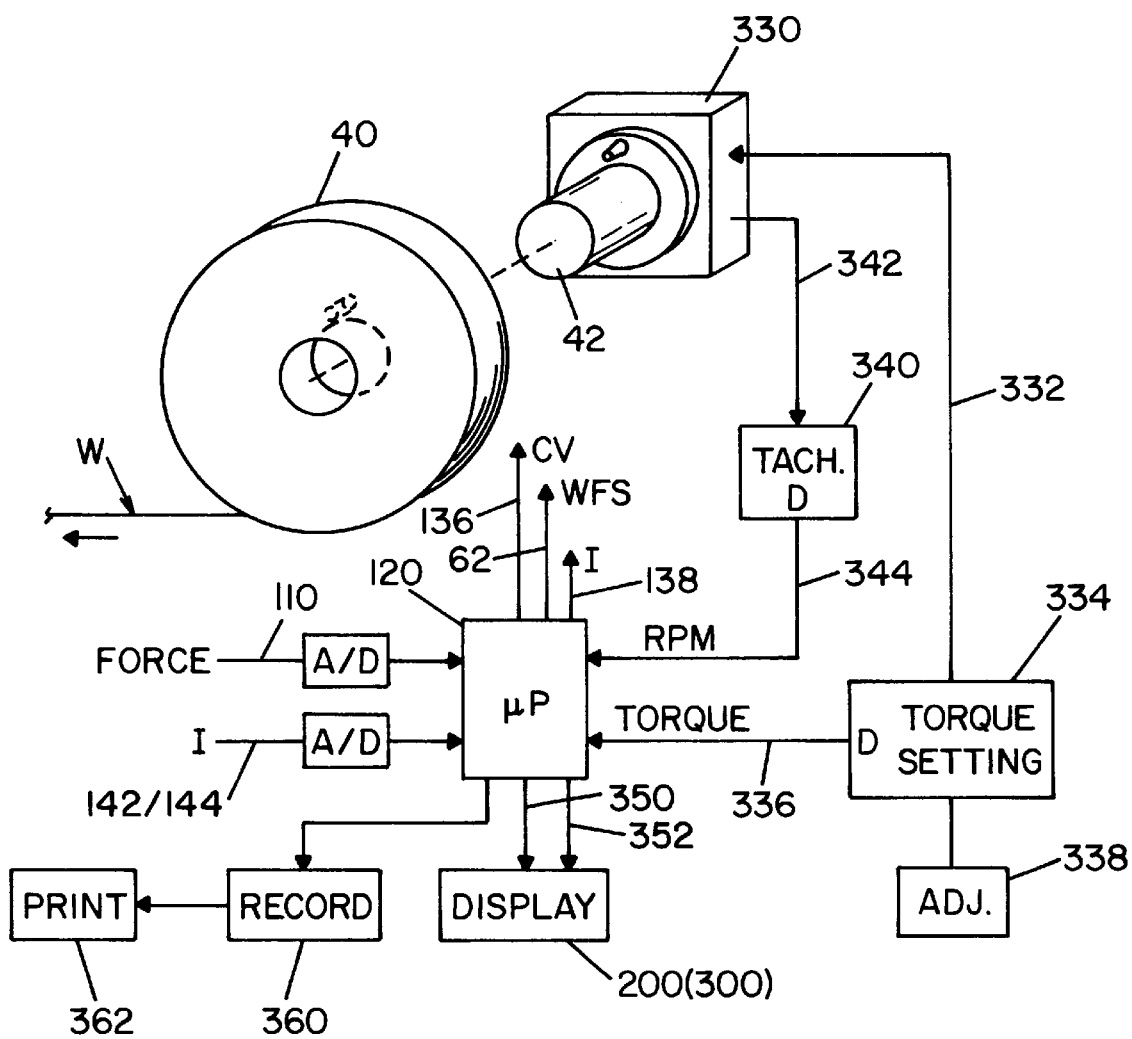

The actual force exerted by load 100 includes not only the pushing force on wire W, but also the pulling force exerted on wire W as it is being pulled from coil 40 or from a drum. To cause the time trace shown on screen 200, 300 to be the actual force on wire W as it is passing through cable 12, the pulling force must be subtracted from the sensed reactive force. Microprocessor or computer 120 includes a numerical constant representing the pulling force on wire W. This constant is subtracted from the sensed force before displaying and/or recording the force time trace. As another way of accomplishing the objective of displaying the actual pushing force, coil 40 is provided with a constant tension control which will allow the use of a numerical constant representing the fixed tension. The microprocessor calculation stage subtracts the constant from the reactive force in line 110. In practice, this corrective action is accomplished by the mechanism shown in FIG. 8 where magnetic clutch 310 is set at a desired torque for a given speed. The torque setting is the voltage in line 332 from torque control device 334. The torque is read by the microprocessor during calibration through the I/O bus as the analog signal on line 336. The torque can be adjusted manually as indicated by device 338. The speed of coil 40 is measured by tachometer 340 as indicated by line 332. An output line 344 directs the actual speed from the microprocessor. The microprocessor adjusts the force by using the speed as indicated on line 344 and the torque setting as found on line 336. The calculated pulling force to be subtracted from the reactive force in line 110.

Microprocessor or computer 120 is programmed to adjust the parameters in lines 62, 136 and 138 to control power supply as well as the wire feed speed (WFS) of wire feeder 50. Microprocessor or computer 120 has output lines 350, 352 for directing the current and force values respectively, to the display unit or screen 200, 300. In a like manner, the microprocessor or computer 120 stores the displayed data and the various calculated data, such as the data recorded on the table above, as indicated by block 360. The storage is the hard drive of the computer. The calculated information, such as data indicated in the above table, is printed from the hard drive to provide hard copy as indicated by block 362. The calculation, recording and printing, as well as displaying of the traces, as used in the preferred embodiment of the present invention employ software for the microprocessor or computer which is not a part of the present invention.

Having thus defined the invention, the following is claimed:

1. A method of determining the feedability of a continuous welding wire having a known diameter, said method comprising the steps of:
    (a) providing a supply of said continuous welding wire;
    (b) pushing said wire by a wire feeder through a welding cable having a given long length and terminating in a welding gun with a tubular contact tip with a wire receiving passage generally matching said selected diameter of said welding wire, said cable having at least one bend and said gun being fixedly close to a workpiece;
    (c) sensing the reactive force of said wire feeder as it pushes said wire through said cable and said tip;
    (d) causing a generally fixed current to flow between said contact tip and said workpiece whereby said advancing welding wire is melted and transferred to said workpiece in accordance with a given welding process; and,
    (e) creating a time based trace of said reactive force for a time cycle.

2. The method as defined in claim 1 including the step of measuring the maximum value of said reactive force during said time cycle.

3. The method as defined in claim 2 including repeating said trace creating step at least once.

4. The method as defined in claim 3 wherein said step is repeated at least twice.

5. The method as defined in claim 2 including the step of averaging the sensed reactive force during said time cycle.

6. The method as defined in claim 5 including the step of recording the averaged reactive force and said maximum reactive force during said time cycle.

7. The method as defined in claim 6 including repeating said trace creating step, measuring step, averaging step and recording step at least once.

8. The method as defined in claim 7 wherein said steps are repeated at least twice.

9. The method as defined in claim 1 including repeating said trace creating step at least once.

10. The method as defined in claim 1 including the steps of measuring the force pulling said wire from said supply of wire and subtracting said pulling force from said sensed reactive force.

11. The method as defined in claim 1 including the step of maintaining a constant tension on said wire as it is pulled from said supply of wire.

12. The method as defined in claim 1 including the step of displaying said time based trace on a screen.

13. The method as defined in claim 12 including repeating said trace creating step and said displaying step on a single screen.

14. The method as defined in claim 12 including the steps of measuring the force pulling said wire from said supply of wire and subtracting said pulling force from said sensed reactive force.

15. The method as defined in claim 12 including the step of maintaining a constant tension on said wire as it is pulled from said supply of wire.

16. The method as defined in claim 1 wherein said time cycle is less than about 10 minutes.

17. The method as defined in claim 1 wherein said time cycle is in the general range of 2–5 minutes.

18. The method as defined in claim 1 wherein said length of said cable is in the general range of 10–30 feet.

19. The method as defined in claim 1 wherein said bend is in the range of 120°–720°.

20. The method as defined in claim 1 wherein said bend is generally 540°.

21. A system for determining the feedability of a continuous welding wire having a known diameter, said system comprising a supply of said continuous welding wire; a wire feeder for pushing said wire through a welding cable having a given long length and terminating in a welding gun with a tubular contact tip with a wire receiving passage generally matching said selected diameter of said welding wire, said cable having at least one bend and said gun being fixedly close to a workpiece; means for sensing the reactive force of said wire feeder as it pushes said wire through said cable and said tip; means for causing a generally fixed current to flow between said contact tip and said workpiece whereby said advancing welding wire is melted and transferred to said workpiece in accordance with a given welding process; and, means for creating a time based trace of said reactive force for a time cycle.

22. The system as defined in claim 21 including means for measuring the maximum value of said reactive force during said time cycle.

23. The system as defined in claim 21 including means for measuring the force pulling said wire from said supply of wire and subtracting said pulling force from said sensed reactive force.

24. The system as defined in claim 21 including means for maintaining a constant tension on said wire as it is pulled from said supply of wire.

25. The system as defined in claim 21 including a screen for displaying said time based trace.

26. The system as defined in claim 21 wherein said time cycle is less than about 10 minutes.

27. The system as defined in claim 21 wherein said time cycle is in the general range of 2–5 minutes.

28. The system as defined in claim 21 wherein said length is in the general range of 10–30 feet.

29. The system as defined in claim 21 wherein said bend is in the range of 120°–720°.

30. The system as defined in claim 21 wherein said bend is generally 540°.

31. A method of determining the feedability of a continuous welding wire having a known diameter, said method comprising the steps of:

(a) providing a supply of said continuous welding wire;

(b) pushing said wire by a wire feeder through a welding cable having a given long length and terminating in a welding gun with a tubular contact tip with a wire receiving passage generally matching said selected diameter of said welding wire, said cable having at least one bend and said gun being fixedly close to a workpiece;

(c) sensing the reactive force of said wire feeder as it pushes said wire through said cable and said tip;

(d) causing a generally fixed current to flow between said contact tip and said workpiece whereby said advancing welding wire is melted and transferred to said workpiece in accordance with a given welding process; and, (e) recording said reactive force determined during time cycle.

32. The method as defined in claim 1 including the step of measuring and recording the maximum value of said reactive force during said time cycle.

33. A method of determining the feedability of a continuous welding wire having a known diameter, said method comprising the steps of:

(a) providing a supply of said continuous welding wire;

(b) pushing said wire by a wire feeder through a welding cable having a given long length and terminating in a welding gun with a tubular contact tip with a wire receiving passage generally matching said selected diameter of said welding wire, said cable having at least one bend and said gun being fixedly close to a workpiece;

(c) sensing the reactive force of said wire feeder as it pushes said wire through said cable and said tip;

(d) causing a generally fixed current to flow between said contact tip and said workpiece whereby said advancing welding wire is melted and transferred to said workpiece in accordance with a given welding process; and, (e) determining if said reactive force exceeds a selection value.

* * * * *